United States Patent [19]

Seo

[11] 4,446,551

[45] May 1, 1984

[54] DATA HIGHWAY SYSTEM WITH DUAL TRANSMITTING LOOP LINES

[75] Inventor: Toshiya Seo, Numazu, Japan

[73] Assignee: Kabushiki Kaisha Meidensha, Tokyo, Japan

[21] Appl. No.: 309,807

[22] Filed: Oct. 8, 1981

[30] Foreign Application Priority Data

Oct. 9, 1980 [JP] Japan ................ 55-141253

[51] Int. Cl.³ ............ H04J 3/14; H04B 3/46
[52] U.S. Cl. ................ 370/16; 370/88; 340/825.05
[58] Field of Search ............ 370/16, 88; 340/825.05, 340/825.16; 179/175.35

[56] References Cited

U.S. PATENT DOCUMENTS

| | | | |
|---|---|---|---|
| 3,458,661 | 7/1969 | Forde et al. | 370/15 |
| 3,569,632 | 3/1971 | Beresin et al. | 370/16 |
| 3,652,798 | 3/1972 | McNeilly | 370/16 |
| 3,859,468 | 1/1975 | Smith et al. | 370/16 |
| 3,987,395 | 10/1976 | Desombre et al. | 340/146.1 C |
| 4,190,821 | 2/1980 | Woodward | 370/16 |
| 4,380,061 | 4/1983 | Mori et al. | 370/16 |

FOREIGN PATENT DOCUMENTS

| | | |
|---|---|---|
| 49-44828 | 11/1974 | Japan . |
| 50-22505 | 3/1975 | Japan . |
| 51-32244 | 9/1976 | Japan . |
| 53-125702 | 11/1978 | Japan . |
| 54-47402 | 4/1979 | Japan . |
| 1229149 | 4/1971 | United Kingdom . |

Primary Examiner—Douglas W. Olms
Attorney, Agent, or Firm—Lowe, King, Price & Becker

[57] ABSTRACT

A data highway system comprises a master station and a plurality of remote stations, connected through dual transmitting loop lines, and detecting means for detecting the breakage or disconnection of transmitting or substantially equal thereto, loop-back is automatically constituted responsive to the output of the detecting means to promptly return to normal condition.

3 Claims, 10 Drawing Figures 4,446,551

DATA HIGHWAY SYSTEM WITH DUAL TRANSMITTING LOOP LINES

BACKGROUND OF THE INVENTION

The present invention relates to a data highway system with dual transmitting loop lines, and more particularly to a data highway system capable of returning to a normal operation by automatically forming a loop back pertinent to a break or disconnect of transmitting lines. Specifically, the present invention relates to a data highway system comprising a plurality of data stations connected through dual transmitting loop lines, and detecting means for detecting the break or disconnect of lines incorporated with each data station, thereby automatically detecting the break or disconnect of transmitting lines constituting a loop back in accordance with the line break.

There have been proposed various kinds of data highway systems for transmitting data between data stations connected by loop transmitting lines. These data highway systems are suitable for various purpose, e.g. remote control of an electric power system including a large number of data stations. A well known transmitting system comprises a master station, and a plurality of slave stations independently connected to the master station by transmitting lines, a data highway system makes it possible to reduce the number of transmitting lines, thereby to provide a low cost system at a low cost. However, if the loop transmitting lines are broken or disconnected due to any trouble in the system, it is impossible to transmit the data, with the result that the system is down.

Attempts have been made to eliminate these troubles which have been encountered with the data highway systems.

For instance, there has been proposed a data highway system with dual transmitting lines in combination with a master station and a plurality of slave stations, wherein a break or disconnect line detecting command transmitted from the master station is scans between the slave stations; such a system is known as a "polling" technique. When a line break or disconnect occurs, the master station transmits a loop back command to the slave station via the broken or disconnected lines on the basis of the polling result. Connections are established to connect the first transmitting line to the second transmitting line so as to constitute a loop back to return to normal condition. However, with this method, it is impossible to have real time processing. Accordingly, it is difficult to apply this method to certain systems, e.g. an electric power system, where it is not permissible to temporarily interrupt the power.

According to another prior art system, and "echo-back" method, such as, in a telephone system, is employed. This method is characterized by a synchronizing bit in a data format. The synchronizing bit is employed as an echo-back command. This method makes it possible to test terminal equipments by the echo-back command to determine whether each terminal equipment normally operates. However, this prior art system is not provided with the means for returning to normal condition. Accordingly, this prior art is not suitable for repairing the line breakage in an electric power system.

In a telephone system, similar to the last mentioned prior art, when line breakage or disconnection is detected, the concerned terminal equipment connects the first transmitting line to the second transmitting line so that a loop back is formed and an alarm signal. The alarm signal is transmitted to the adjacent terminal equipment. The terminal equipment including a breakage line receives the alarm signal via a transmitting line that is loop-backed to recognize that the loop-back is established, thereby ceasing to produce the alarm signal. With this method, there is drawback that data derived while the loop-back is being formed is disregarded.

SUMMARY OF THE INVENTION

With the above in mind, an object of the present invention is to provide a data highway system with dual transmitting lines capable of automatically detecting a portion of a line where a break or equivalent malfunction occurs form a loop back, thereby preventing the transmitting function from being invalid.

Another object of the present invention is to provide a data highway system with dual transmitting lines wherein remote or slave stations are able to detect a line break or equivalent malfunction of a transmitting line, wherein the detection is independent of the master station and is indicated by a simple line breaking or disconnect detecting means, such as two timers.

A further object of the present invention is to provide a data highway system with dual transmitting lines wherein the system has simplified hardware and occupies only a small amount of space.

BRIEF DESCRIPTION OF THE DRAWINGS

The features and advantages of a data highway system with dual transmitting loop lines according to the present invention will become more apparent from the following description taken in conjunction with the accompanying drawings, in which.

DETAILED DESCRIPTION OF THE PREFERRED EMBODIMENT

Reference is made to an embodiment of a data highway system according to the present invention.

Figure 1:
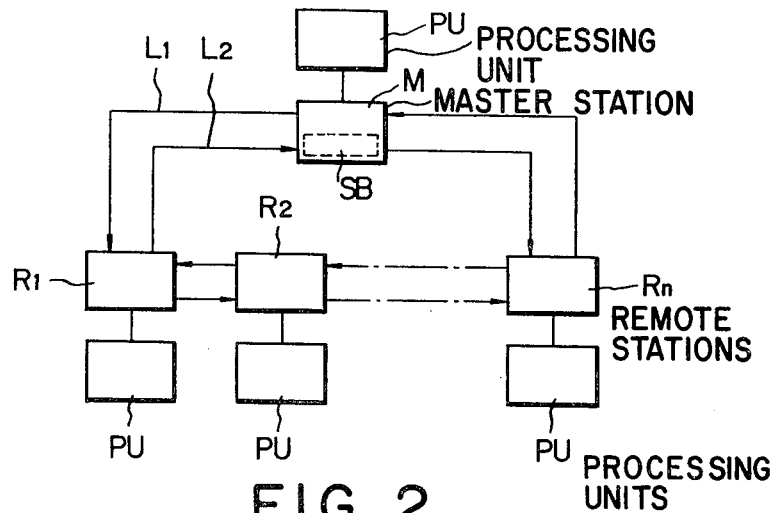
FIG. 1 is a block diagram schematically illustrating an embodiment of a data highway system with dual transmitting loop lines according to the present invention.

FIG. 1 is a block diagram schematically illustrating a loop back system employed in the data highway system with dual transmitting lines according to the present invention.

The data station illustrated in FIG. 1 comprises a master station M and a plurality of remote or slave stations $R_1$, $R_2$, ..., and Rn. The master station M is connected to the plurality of remote stations $R_1$, $R_2$, ..., and Rn through first and second loop-transmitting lines $L_1$ and $L_2$ wherein each information signal passing through the lines $L_1$ and $L_2$ is transmitted in the opposite direction as indicated by arrow. A separate information processing unit PU is connected to the data station M and the plurality of information processing units $R_1$, $R_2$, ..., and Rn. The information processing unit PU performs predetermined processing on data transferred to each data station. The master station M includes a substation SB which is formed similarly to the remote stations $R_1$, $R_2$... $R_n$.

A break line or disconnection in either of the first and second lines or both lines. It is also assumed that there happens substantially the same condition as that of the line breakage because of the interruption of power supply provided in the data station, or faults the transmitter and/or the receiver incorporated therein.

The method of detecting such a condition and retrieving therefrom will be described below.

The master station M transmits signals in opposite directions to the first and second lines $L_1$ and $L_2$. Each remote station $R_1$, $R_2$, ... Rn and master station M captures or relays and regenerates data received thereby, as transmitted through the first and second transmitting lines Lhd 1 and $L_2$; the remote station responds to the received information and transmits the information contained in the data signal to the neighboring station. Thus, remote station $R_K$ responds to a data signal supplied to it from station $R_{K-1}$ via line $L_1$ and transmits the first data signal via line $L_1$ to station $R_{K+1}$; station $R_K$ responds to a second data signal supplied to it from station $R_{K+1}$ via line $L_2$ and transmits the second data signal to station $R_{K+1}$ via line $L_2$. The method of transmitting data comprises the steps of interrupting the relaying and regenerating in the first transmitting line, and shifting a gate (not shown). Each station comprises one serial/parallel converter circuit. Each station has two sets of transmitters and receivers corresponding to the dual transmitting lines $L_1$ and $L_2$. Each remote station $R_1$, $R_2$, ..., $R_n$, but not master station M, has two sets of retrigger timers $T_1$ and $T_2$ having different durations ($T_1$, $T_2$). Timers $T_1$ and $T_2$ are connected to the outputs of receivers in the remote station responsive to the first and second transmitting lines $L_1$ and $L_2$, to determine whether a signal exists in the transmitting lines or not.

Assume that a signal on line $L_1$ or $L_2$ disappears because the line carrying the signal breaks. In response to the line break, there is a swift in the output status of timer $T_1$ provided in the remote station directly connected to the broken transmitting line or lines, e.g., timer $T_1$ goes from "H" to "L" (time up). In response to this operation, dummy data are transmitted to the neighboring remote station. Further, in the case of a line break, all the remaining remote stations which are located downstream of the broken line portion are placed in a non-signal condition. As a result, there is a shift in the output status of the timers $T_1$ provided in the remaining remote stations, e.g., from "H" to "L" (time up). Thus, as stated above, dummy data are transmitted in turn to the neighboring remote stations due to the actuation of the timers $T_1$. A predetermined time ($T_1$) after the break indication is transmitted to the remaining remote stations, i.e., the remote stations different from the remoate station where the line breaks, the timers $T_1$ in the remaining remote stations return to an initial condition, that is, shift in output status, e.g., from "L" to "H". This return occurs because the dummy data are transmitted to these remote stations. Since a dummy data signal is not transmitted to the remote stations. Since a dummary data signal is not transmitted to the remote station directly connected to the broken transmitting line, the timer $t_2$ provided in the remote station directly connected to the broken transmitting line shifts output status from "H" to "L". The shift from "H" to "L" of timer $T_2$ at the remote station directly connected to the broken line enables master station M to recognize where the line break has occurred in the transmitting lines.

The above method and the simplified circuit at each remote station makes it possible to detect the break in the transmitting lines.

Consideration is now given to forming a loop after the line break is detected, in elation to the case of the line break in the first transmitting line $L_1$, the second transmitting line $L_2$, or both lines $L_1$ and $L_2$.

Figure 2:
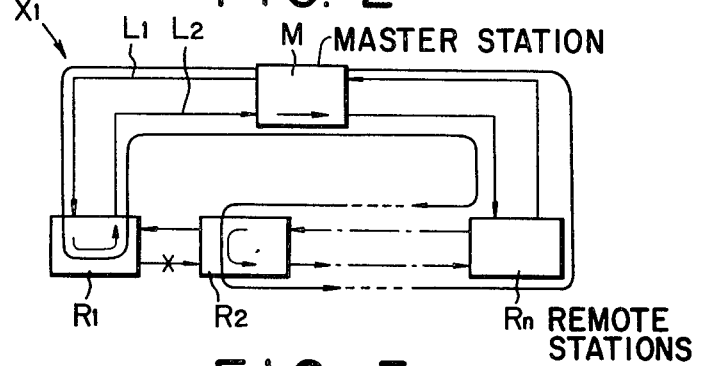
FIG. 2 is a block diagram schematically illustrating a break in the first transmitting line shown in FIG. 1.

First, let us suppose that a break occurs in the first transmitting line $L_1$ between stations $R_1$ and $R_2$. As shown in FIG. 2, the data received by station $R_2$ via the second transmitting line $L_2$ is loop-backed to the first transmitting line $L_1$ via station $R_2$. Simultaneously with this, the data transmission from station $R_2$ to station $R_1$ through the second transmitting line $L_2$ is interrupted. In the reamining data stations positioned on the both sides of the broken line portion, the data transmitted through the second transmitting line $L_2$ to station $R_1$ are not received by station $R_1$. Instead, data received by station $L_1$ via the first transmitting line $L_1$ are looped back from station $R_1$ so they are transmitted to station M via the second transmitting line $L_2$.

Thus, loop-back is performed in both of the remote stations $R_1$ and $R_2$ on opposite sides of the location where the line breaks. Each remote station $R_1$, $R_2$, ... $R_n$ which detects a line break transmits information indicating that it has detected a break to the master station M in response to a specified command from the master station M. However, even if the loop back is formed in the transmitting line $L_1$, two loops are formed at the boundary of the location of the line break in the flow of information as shown by label $X_1$. The master station M responds solely to the data transmitted from the station positioned forward with respect to the line break. The master station M considers the transmitting line as being in a break condition, in response to information indicating the line break, as derived from the remote stations $R_1$, $R_2$, ... Rn or when a response occurs from the remote station positioned forward of the remote station immediately adjacent the break. In such a situation, the master station M transmits the received data coupled to it via the second transmitting line $L_2$ to a remote station on the opposite side of station M via second transmitting line $L_2$.

Figure 3:
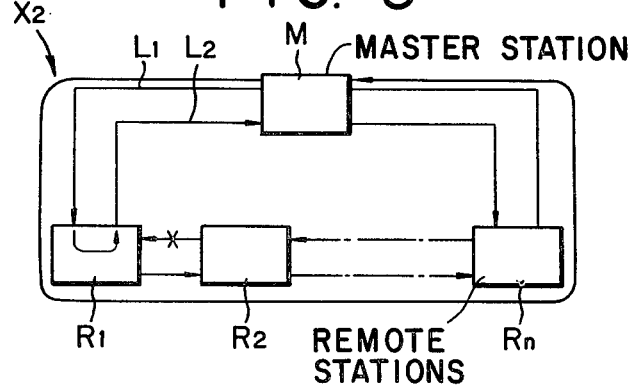
FIG. 3 is a block diagram schematically illustrating a break in the second transmitting line shown in FIG. 1.

Consider the situation of a line break of the second transmitting line $L_2$ between remote stations $R_1$ and $R_2$ shown in FIG. 3. The break is detected at station $R_1$, causing a loop-back to be formed to couple the data received by station $R_1$ on line $L_1$ to be fed back to master station M, with an indication of the location of the data break, via the second transmitting line $L_2$.

Each of master station M and remote stations $R_1$, $R_2$, ... Rn receives a data signal via the first transmitting line $L_1$ and transmits the data signal received on line $L_1$ to the next station via the first transmitting line $L_1$, where station M transmits a data signal to station $R_1$ via line $L_1$, station $R_K$ transmits a data signal to station $R_{K+1}$ via line $L_1$ and station Rn transmits a data signal to station M via line $L_1$, where k is selectively every integer from 2 to (n−1). Accordingly, even if a line break occurs in the second transmitting line $L_2$, there is no inconvenience in transmitting or receiving the data. For this reason, in the case of a break in the second transmitting line $L_2$ between stations $R_1$ and $R_2$, an information signal indicating a line break at station $R_1$ is coupled back to station M from station $R_1$ via line $L_2$. The signal transmitted from station M to station $R_1$ via line $L_1$ is coupled to stations $R_2$... Rn via line $L_1$, as indicated by label $X_2$, FIG. 3.

Figure 4:
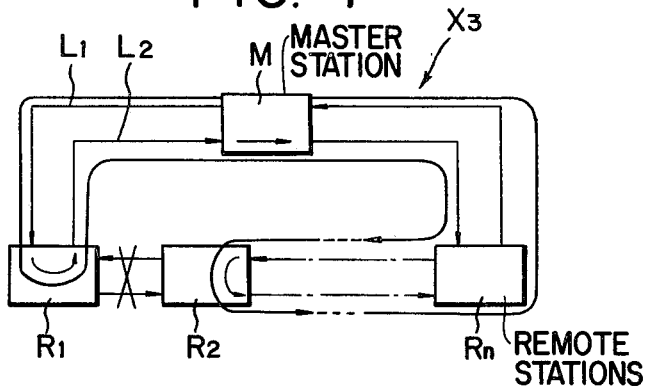
FIG. 4 is a block diagram schematically illustrating a break of the first and the second transmitting lines shown in FIG. 1.

In the case for a break in both transmitting lines $L_1$ and $L_2$ between stations $R_1$ and $R_2$, as shown in FIG. 4, the line break is detected in both stations $R_1$ and $R_2$ adjacent the portion of the line where the break occurs; detection at stations $R_1$ and $R_2$ results in two loop-back networks being formed. One network is from station M to station $R_1$ via lines $L_1$ and $L_2$; the other network is from station M to station $R_2$ via lines $L_2$ and $L_1$ via stations $R_n$... $R_3$ (not shown). The processing in this case is substantially the same as that which occurs for a line break in the first transmitting line $L_1$. In the case of the first transmitting line $L_1$, the loop back is formed at the data station $R_1$ where the break of the first transmitting line $L_1$ is detected. Simultaneously, the transmission of the data by the second transmitting line $L_2$ is interrupted, thus forming the same condition as for a break of the second transmitting line $L_2$.

For this reason, when the loop back is formed at both stations surrounding the broken line portion, there is a time difference in the break indicating signals arriving at station M via lines $L_1$ and $L_2$. The flow of the information is indicated by label $X_3$.

Reference is made to the treatment in connection with the line break in both ends of the master station M.

The master station M comprises two timers $T_1$ having time $T_1$ required for timing up. One of timers $T_1$ is connected to the output of the receiver in station M connected to the first and second transmitting lines $L_1$ and $L_2$. In this case, the master station M does not comprise timer $T_1$.

Figure 5A:
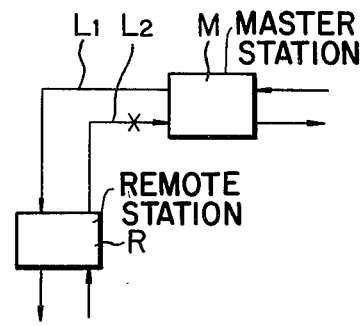
FIGS. 5A to 5D are block diagram illustrating examples of line breaks occuring in both ends of the master station shown in FIG. 1.

For instance, if a line break occurs in the second transmitting line $L_2$ between stations R and M, i.e., at the receiver side of station M connected to line $L_2$, as shown in FIG. 5A, there is no inconvenience in transmitting or receiving information on first transmitting line $L_1$. In this case, the line break is detected because timer $T_2$ in receiver R becomes operative in response to the break in the second transmitting line $L_2$.

Figure 5B:
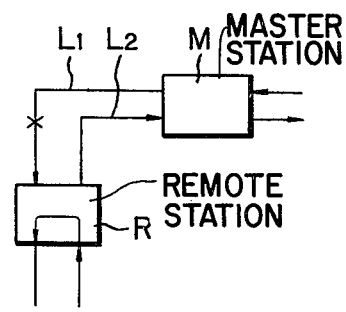
Figure 5C:
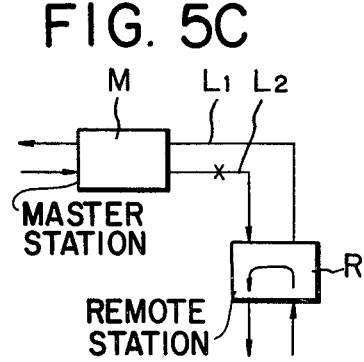
Figure 5D:
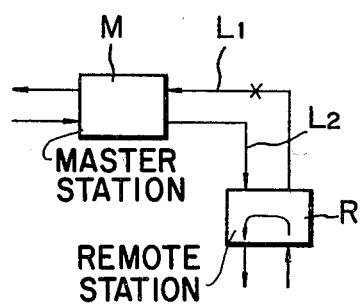

As shown in FIG. 5B, if a break occurs between stations M and R in the first transmitting line $L_1$, at the transmitting end of station M connected to line $L_1$, the line break is detected in the remote station R receiving the data transmitted on the first transmitting line $L_1$. Thus, a loop-back is formed, so that the information indicating the break location is transferred to the master station M. In this case, there is no inconvenience in transmitting or receiving the data. In the case for breaks in both transmitting lines $L_1$ and $L_2$, the above treatments are simultaneously carried out, thereby forming one closed loop. If a break occurs in the receiving end of the second transmitting line $L_2$ between stations M and R, i.e., at the transmitter end of station M connected to line $L_2$, the usual treatment in connection with a break in the second transmitting line $L_2$ is carried out in the remote station R, as shown in FIG. 5C. In the event that a break occurs between station M and R in the receiving end of station M responsive to the signal transmitted on the first transmitting line $L_1$, station M detects the break in the first transmitting line $L_1$ at the same time it interrupts the reception of data via line $L_1$ and transmits the data via the second transmitting line $L_2$, as illustrated. The remove station in the neighborhood of the receiving end of the second transmitting line considers that the break occurs in the secod transmitting line $L_2$. Thus, as shown in FIG. 5D, the loopback is formed. Since there are no data received by station M from the first transmitting line $L_1$, the transmitting line is shifted to a mode wherein station M receives the data from the second transmitting line $L_2$.

The detailed circuit diagrams of the master station, and each remote station are described with reference to FIGS. 6 and 7.

Figure 6:
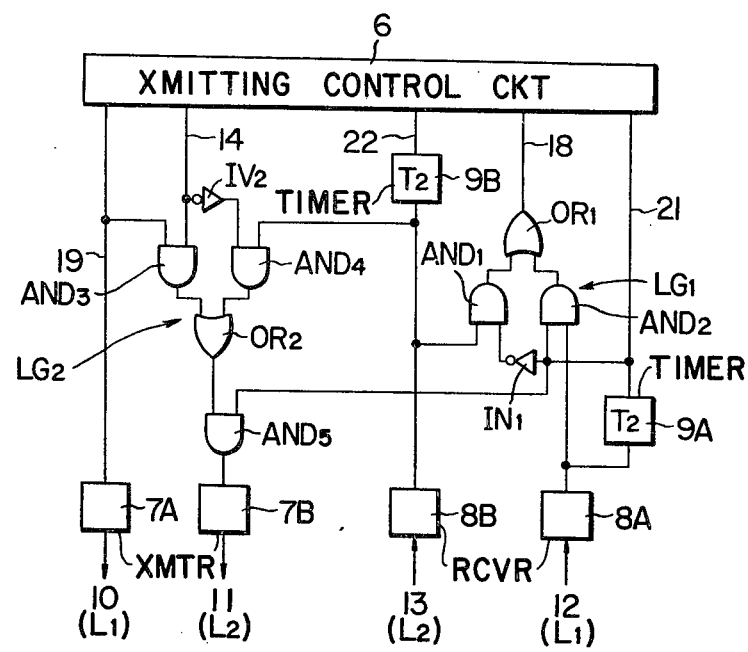
FIG. 6 is a circuit diagram illustrating the detail of the master station shown in FIG. 1.

FIG. 6 is a block diagram of one example of the internal construction of the master station M containing transmitting control unit 6 including a serial/parallel converting circuit. The data transmitted to station M via the first receiving/transmitting line ($L_1$) 12 and the second receiving/transmitting line ($L_2$) 13 are received by receivers 8A and 8B. The signals received by receivers 8A and 8B are transmitted to the $T_2$ timers 9A and 9B which produce a signal having a duration $T_2$ required for timing up. The signal indicating the remote station where a break occurs in the first transmitting line $L_1$ is derived as an output from timer 9A on lead 21 and transmitted to the transmitting control unit 6.

The outputs of the receivers 8A and 8B and the output of the timer 9A are fed to a logical circuit $LG_1$. The logical circuit $LG_1$ comprises AND gates $AND_1$, and $AND_2$, and OR gate $OR_1$, as well as inverter $IN_1$. Gate $OR_1$ derives an output signal on lead 18 which is fed to the transmitting control unit 6.

The output of the timer 9B on lead 22 is fed to the transmitting control unit 6 indicative of a break in the second transmitting line $L_2$. Circuit 6 responds to the signals on leads 18, 21 and 22 to derive a gate signal on lead 14 and a data signal on lead 19. The output signals from timers 9A and 9B are combined with the signals on leads 14 and 19 in logic circuit $LG_2$, including AND gates $AND_3$, $AND_4$ and OR gate $OR_2$, as well as inverter $IN_2$ and AND gate $AND_5$ having first and second input terminals respectively connected to the outputs of OR gate $OR_2$ and timer 9A. The output of logical circuit $LG_2$ is coupled to the transmitter 7B, having an output connected to the transmitting line 11 of the second transmitting system $L_2$. The transmitted data signal on lead 19 is fed to the transmitter 7A, having an output fed to the transmitting line 10 of the first transmitting system $L_1$.

Figure 7:
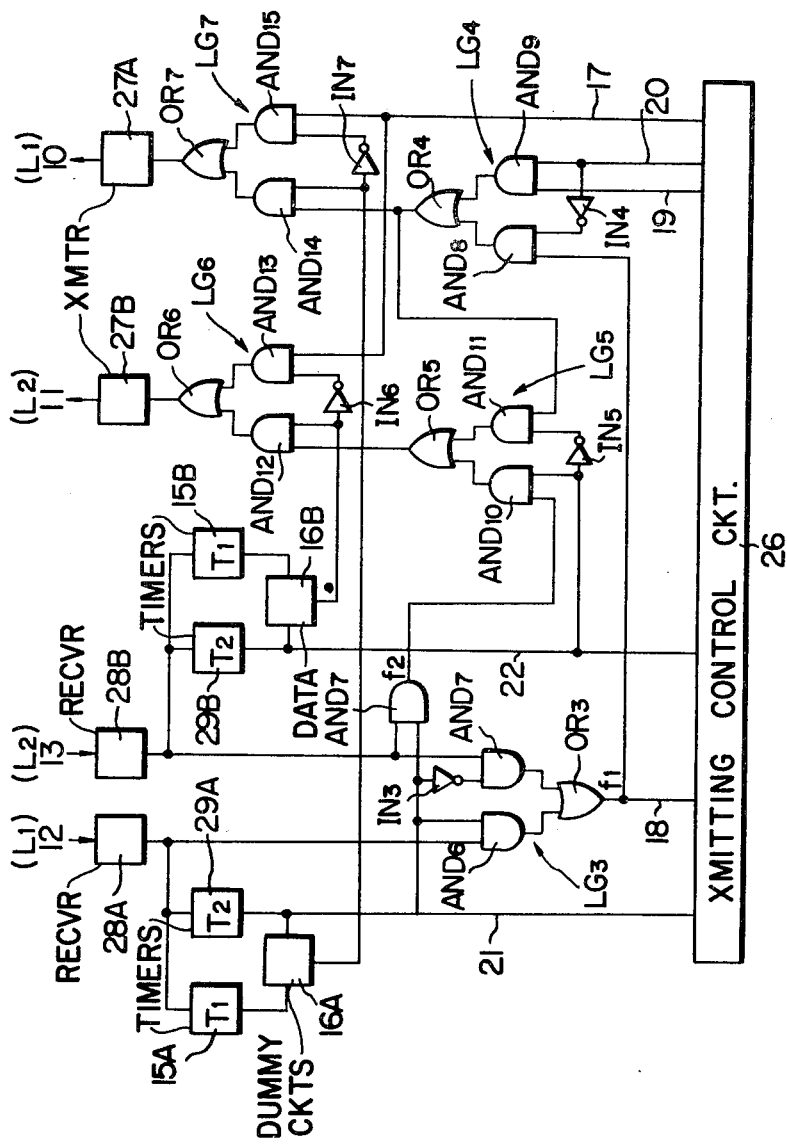
FIG. 7 is a circuit diagram illustrating the detail of the remote station shown in FIG. 1.

FIG. 7 is a circuit diagram of the internal construction in the remote stations R, $R_1$, $R_2$, ... Rn.

The signals received by the remote station from the first receiving/transmitting line ($L_1$) 12 and the second receiving/transmitting line ($L_2$) 13 are received by the receivers 28A and 28B. The output of the receiver 28A is fed to the timer 15A having a time $T_1$ required for timing up and the timer 29A having a time $T_2$ required for timing up. Each of the timers 15A and 29A has an output fed to the dummy data deriving circuit 16A. The output of $T_2$ timer 29A is fed to the transmitting control unit 26 as a signal indicative of a break of the first transmitting system $L_1$.

The output of the receivers 28A and 28B and the output of the timer 29A are transmitted to a logical circuit $LG_3$ comprising AND gate $AND_6$ and $AND_7$, and OR gate $OR_3$, and inverter $IN_3$. OR gate $OR_3$ derives a logic output $F_1$ fed to the transmitting control circuit 26. The output of the receiver 28B is fed to $T_1$ and $T_2$ timers 15B and 29B and, having outputs fed to the dummy data transmitting gate circuit 16B. The otput of $T_2$ timers 29B is fed to the transmitting control unit 26 as a signal indicative of a break of the second transmitting system $L_2$.

Transmitted data derived from circuit 26 on lead 19 and a gate signal derived from circuit 26 on lead 20 are combined with the first output $f_1$ of the logic circuit $LG_3$ are fed in logic circuit $LG_4$, comprising AND gates $AND_8$ and $AND_9$, OR gate $OR_4$, and inverter $IN_4$.

The output of the logic circuit $LG_4$, the second output of the logic circuit $LG_3$, and the signal on lead 22 indicative of a break in the second transmitting system $L_2$, as derived as an output of the timer 29B, are fed to a logical circuit $LG_5$ comprising AND gates $AND_{10}$ and $AND_{11}$, and OR gate $OR_5$. The logic output of the logical circuit $LG_5$, the output of the dummy data transmitting gate circuit 16B and the dummy data fed from the transmitting control unit 26 on lead 17 are fed to a logical circuit $LG_6$. Comprising AND gates $AND_{12}$, and $AND_{13}$, OR gate and $OR_6$, and inverter $IN_6$. The logical output of the logical circuit $LG_6$ is fed to the transmitter 27B. The output of the transmitter 27B is fed to the transmitting line 17 of the second transmitting system ($L_2$). The output of the dummy data transmitting gate circuit 16A, the logical output of the logical circuit $LG_4$, and the dummy data on lead 17 fed from the transmitting control unit 26 are fed to the logical circuit $LG_7$, having logical output fed to the transmitter 27A. The output of the transmitter 27A is fed to the transmitting line 10 of the first transmitting system ($L_1$).

The internal comstruction and the operation of the data station has been previously described. According to a break condition, such as a break of the first transmitting system, a break of the second transmitting system, and a break of the both transmitting systems, the loop back is form, thereby making it possible to interrupt the transmitting function.

According to the present invention, in a loop-data highway system wherein a plurality of data stations are connected by the double transmitting line in which the transmitting direction is different to each other, when a break in a single or double transmitting system occurs, or when a condition equivalent to the break occurs, e.g., due to an interruption of the power supply of the data station or trouble with the transmitter and receiver, the break is automatically detected by the two timers, each having different time constant, assembled in each data station. Thus, loop-back is formed due to the breakage of the first second or both transmitting systems. This system makes it possible to continue the transmitting function with the simplified construction.

It is to be understood that modifications and variations of the embodiments of the present invention disclosed herein may be restored to without departing from the spirit of the invention and the scope of the appended claims.

What is claimed is:

1. A data highway system comprising first and second unidirectional looped data transmission lines, n data stations connected by said two transmission lines so data are transmitted between the stations via said lines in opposite directions, where n is an integer greater than one, data station K, where K is selectively every one of the n integers, including:

(a) line break or disconnect detecting means comprising first and second timers having different time periods $T_1$ and $T_2$, where $T_1$ is smaller than $T_2$, said first and second timers being connected to the lines connected to the station K to be responsive to data transmitted on the first transmission line to produce first and second outputs respectively having time intervals equal to periods $T_1$ and $T_2$, said second output indicating a break in the first transmission line, (b) gate signal producing means connected to be responsive to said first and second outputs of said timers for deriving a dummy data gate signal, (c) first means for selecting the data transmitted from the first transmission line in response to the output of said second timer, (d) transmission control means for controlling transmission in response to the break indicating output derived as the output of said second timer and the output of said first means for deriving outputs including transmission data, a transmission gate signal and dummy data, (e) second means for selecting the output of said first means and the transmission data at mutually exclusive times in response to the value of the transmission gate signal, (f) third means for selectng the output of said second means and the dummy data at mutually exclusive times in response to value of the dummy data gate signal to transmit the signal thus selected to the first transmission line, (g) fourth means responsive to the second output as derived from said second timer and data transmitted from the second transmission line to produce a gate signal indicating a break of the first transmission line, and (h) fifth means for selecting the transmission data fed as the output of said second means in response to the output of said fourth means to transmit the signal thus selected to the second transmission line, whereby when (1) there is no break in the first transmission line, the data transmitted on the first transmission line is routed to the first transmission line via a normal path including said third means, (2) a break on the first transmission line occurs, (i) the data station positioned downstream of the broken portion routes the dummy data to the first transmission line via said normal path and data transmitted from the second transmission line is routed to the first transmission line via the looped-back path including the third means, and (ii) at the data station positioned upstream of the broken portion, said data transmitted from the first transmission line are routed to the second transmission line via the looped-back path including said fifth means.

2. A data highway system according to claim 1, wherein said data station K includes:

(a) a second line break or disconnect means comprising third and fourth timers having different time periods $T_1$ and $T_2$, where $T_1$ is smaller than $T_2$, said third and fourth timers being responsive to data transmitted from the second transmission line to produce third and fourth outputs respectively having time intervals of period $T_1$ and $T_2$, said fourth output serving as a break indicating signal for the second transmission line, and (b) gate signal deriving means responsive to said third and fourth outputs of said timers to produce a second dummy data gate signal, whereby when (1) no break occurs on the first and second transmission lines, the data transmitted on the first transmission line is routed to the first transmission line via said normal path including said third means, and the data transmitted on the second transmission line is routed to the second transmission line via a second normal path including said fifth means, and (2) a break occurs on the second transmission line at the data station downstream of the broken portion, the data transmitted from the first transmission line is routed to the second transmission line via the looped-back path including said fifth means.

3. A data highway system according to claim 1, wherein said data station K includes:

(a) a second line break or disconnect means comprising third and fourth timers having different time periods $T_1$ and $T_2$, where $T_1$ is smaller than $T_2$, said third and fourth timers being responsive to data transmitted from the second transmission line to produce third and fourth outputs respectively having time intervals of period $T_1$ and $T_2$, said fourth output serving as a break indicating signal for the second transmission line, and (b) gate signal deriving means responsive to said third and fourth outputs of said timers to produce a second dummy data gate signal, whereby when (1) no break occurs on the first and second transmission lines, the data transmitted on the first transmission line is routed to the first transmission line via said normal path including said third means, and the data transmitted on the second transmission line is routed to the second transmission line via a second normal path including said fifth means, (2) a break occurs on the second transmission line at the data station downstream of the broken portion, the data transmitted from the first transmission line is routed to the second transmission line via the looped-back path including fifth means, and (3) breaks occur on both the transmission lines, (i) at the data station downstream of the broken portion of the first transmission line, the data transmitted from the second transmission line is routed to the first transmission line via the looped-back path including said third means, and (ii) at the data stion downstream of the broken portion of the second transmission line, the data transmitted from the first transmission line is routed to the second transmission line via the looped-back path including said fifth means.

* * * * *